United States Patent [19]

Degnan et al.

[11] Patent Number: 4,588,560

[45] Date of Patent: May 13, 1986

[54] HYDROPROCESSING REACTOR FOR CATALYTICALLY DEWAXING LIQUID PETROLEUM FEEDSTOCKS

[75] Inventors: Thomas F. Degnan, Yardley, Pa.; Bruce P. Pelrine, Lawrenceville, N.J.

[73] Assignee: Mobil Oil Corporation, New York, N.Y.

[21] Appl. No.: 626,559

[22] Filed: Jun. 29, 1984

[51] Int. Cl.$^4$ ............................................. B01J 8/08
[52] U.S. Cl. ................................ 422/211; 202/128; 208/109
[58] Field of Search ............... 422/211, 239, 292, 177, 422/190, 216, 209, 144, 220, 223; 202/128, 129; 201/32, 33; 208/108, 109; 34/57 A, 57 B, 57 C

[56] References Cited

U.S. PATENT DOCUMENTS

| Re. 28,398 | 4/1975 | Chen et al. | 208/111 |
|---|---|---|---|
| 2,487,795 | 11/1949 | Evans | 422/223 |
| 2,723,949 | 11/1955 | McCausland | 422/223 |
| 3,284,317 | 11/1966 | Jahnig et al. | 202/129 |
| 3,492,740 | 1/1968 | Geipel et al. | 34/57 A |
| 3,589,027 | 6/1971 | Duzan | 34/57 C |
| 4,213,847 | 7/1980 | Chen et al. | 208/18 |
| 4,222,855 | 9/1980 | Pelrine et al. | 208/111 |
| 4,412,909 | 11/1983 | Faulkner et al. | 201/32 |

FOREIGN PATENT DOCUMENTS 1402543  8/1975  United Kingdom ............... 34/57 C Primary Examiner—Barry S. Richman
Assistant Examiner—Titus B. Ledbetter, Jr.
Attorney, Agent, or Firm—Alexander J. McKillop; Michael G. Gilman

[57] ABSTRACT

A reactor for catalytically dewaxing a waxy distillate consisting of a lubricating oil or liquid petroleum feedstocks utilizing a shape-selective crystalline aluminosilicate zeolite catalyst in order to obtain a lubricating oil having a low pour point and a high viscosity index, particularly, a plate-type hydroprocessing trickle reactor construction for catalytically dewaxing liquid petroleum feedstocks. The reactor is essentially constituted of an inclined plate trickle bed reactor wherein a tray of generally permeable construction supports a bed of catalyst material, such as crystalline zeolite, and in which the liquid petroleum feedstock trickles downwardly through the catalyst material from the upper end of the reactor towards the lower end of the reactor, while hydrogen is concurrently injected into the space below the permeable tray at the upper end of the reactor in the direction towards the lower end of the reactor. The hydrogen, under a slight superpressure passes through the permeable plate and percolates through the catalyst bed to thereby contact and efficiently strip the downwardly trickling stream of liquid petroleum feestock of low boiling conversion products or waxy components, such as naphtha. The generated gases resulting from the reaction, such as hydrogen, naphtha and LPG are collected in a head space provided above the catalyst bed on the permeable plate, and are scavenged at one end of the reactor through entrainment in an inert carrier gas introduced into the reactor at the opposite end thereof and which flows through the head space above the catalyst.

11 Claims, 2 Drawing Figures

HYDROPROCESSING REACTOR FOR CATALYTICALLY DEWAXING LIQUID PETROLEUM FEEDSTOCKS

BACKGROUND OF THE INVENTION

1. Field of the Invention

The present invention relates to a reactor for catalytically dewaxing a waxy distillate consisting of a lubricating oil or liquid petroleum feedstocks utilizing a shape-selective crystalline aluminosilicate zeolite catalyst in order to obtain a lubricating oil having a low pour point and a high viscosity index, and more particularly, relates to a novel and unique plate-type hydroprocessing trickle reactor construction for catalytically dewaxing liquid petroleum feedstocks.

In the hydroprocessing of liquid petroleum feedstocks, and particularly so called heavy feedstocks, it is a basic purpose of the process of catalytically dewaxing the liquid petroleum feedstocks to remove lighter conversion products from the liquid petroleum flow while concurrently providing a hydrogenative environment for catalytic conversion, which is particularly utilized in the case of the processing of highly waxy feedstocks, such as in catalytic lube processing. Frequently, lighter products which are obtained from cracking and/or hydrocracking reactions compete with the heavier feed molecules for access to the acidic cracking sites in zeolites or silica-alumina cracking catalysts which are employed in the implementation of the catalytic dewaxing processes. Inasmuch as these lighter products diffuse more rapidly into the catalyst than the larger feed molecules, they have a tendency to retard the rate of conversion of the heavier molecules. Moreover, the lighter products also tend to be either more difficult to crack, such as low molecular weight parafins, or easier to polymerize, such as low molecular weight olefins, and possess a tendency to coke more readily then their heavier counterparts so as to thereby retard the conversion of the heavier molecules to an even greater extent.

2. Discussion of the Prior Art

This competition between the light and heavy liquid petroleum molecules obtained from the cracking or hydrocracking process for access to catalytic sites is rendered particularly critical when there is employed a catalyst which is essentially constituted of a shape-selective zeolite, for example, a defined crystalline aluminosilicate zeolite catalyst such as ZSM-5 for the dewaxing of liquid petroleum or lube stocks under moderate hydrogen pressures (400 psig) and at moderate temperatures (550° F. to 675° F). In a typical reactor employing a zeolite catalyst, for example, such as zeolite ZSM-5, compounds which boil at temperatures higher than 650° F. flow concurrently with naphtha and LPG over the shape-selective catalyst. Processes and reactors which utilize aluminosilicate zeolite catalysts, such as ZSM-5, or other zeolites having smaller pore openings, such as ZSM-11, ZSM-12 and those having pore openings larger then those of erionite or zeolite ZK-5, ZSM-23 and ZSM-35, are disclosed in Bruce P. Pelrine et al. U.S. Pat. No. 4,222,855 and in Nai Y. Chen et al. U.S. Reissue Pat. No. 28,398, both assigned to the Mobil Oil Corporation, and the disclosures of which are incorporated herein by reference. Although the utilization of different types of hydroprocessing reactors for the implementation of catalytic dewaxing processes for liquid petroleum lube or feedstock is broadly disclosed in the prior art, as exemplified by the above-mentioned U.S. patents, broadly referring to stirring tank-type reactors or trickle bed reactors, there is an obvious need in the technology to more precisely define specific hydroprocessing reactor designs which, in a highly efficient and novel manner, will facilitate the removal of the lighter products from the liquid petroleum feedstocks through the intermediary of hydrogen stripping while concurrently preserving an intimate three-phase contacting relationship among hydrogen, liquid petroleum feedstock and catalyst, which is necessary for the efficient hydrotreatment and upgrading through the dewaxing of the liquid petroleum feedstocks.

SUMMARY OF THE INVENTION

In essence, the present invention provides for a novel hydroprocessing plate-type reactor construction which will facilitate the catalytic dewaxing of liquid petroleum or lube feedstocks in a highly efficient and economical manner, particularly through the use of reactors employing stationary beds of a defined, shape-selective crystalline aluminosilicate zeolite catalyst, preferably ZSM-5. Pursuant to particular features of the inventive hydroprocessing reactor, the latter is essentially constituted of an inclined plate trickle bed reactor wherein a tray of generally permeable construction supports a bed of catalyst material, such as the crystalline zeolite, and in which the liquid petroleum feedstock trickles downwardly through the catalyst material from the upper end of the reactor towards the lower end of the latter, while hydrogen is concurrently injected into the space below the permeable tray at the upper end of the reactor in the direction towards the lower end of the reactor. The hydrogen, under a slight superpressure passes through the permeable plate and percolates through the catalyst bed to thereby contact and efficiently strip the downwardly trickling stream of liquid petroleum feedstock of low boiling conversion products or waxy components, such as naphtha. The generated gases resulting from the reaction, such as hydrogen, naphtha and LPG are collected in a head space provided above the catalyst bed on the permeable plate, and are scavenged at the lower end of the reactor through entrainment in an inert carrier gas introduced into the reactor at the upper end thereof and which flows through the head space above the catalyst bed towards the lower end of the plate reactor.

Pursuant to a further embodiment of the inventive hydroprocessing plate-type catalytic reactor construction, in which the inclined stationary bed of catalyst, such as shape-selective crystalline zeolite, in essence, ZSM-5, is supported on an inclined permeable plate with the liquid petroleum stock being introduced at the upper end of the plate end trickling down to the lower end of the reactor plate through the catalyst bed as described hereinabove, but with the primary distinction in that the inert carrier gas is introduced into the head space above the catalyst bed from the lower end of the reactor, and flows in counterflow with the liquid petroleum feedstock so as to scavenge the hydrogen gas and volatile conversion products contained therein from the upper end of the reactor.

Accordingly, it is a primary object of the present invention to provide a novel hydroprocessing plate-type trickle reactor for catalytically dewaxing liquid petroleum feedstocks.

It is a more specific object of the present invention to provide a plate-type hydroprocessing trickle reactor wherein lighter volatile or low-boiling conversion products are stripped from liquid petroleum feedstock trickling downwardly through a stationary catalyst bed supported on an inclined permeable plate by means of hydrogen introduced below the plate, and upon passing through the plate percolating through the catalyst bed causing stripping of the low-boiling volatile conversion products, and with the gases of the hydrogen and volatile conversion products being entrained in and then scavenged by a carrier gas flowing in the head space above the catalyst bed.

In essence, the present invention has as its object the provision of a plate-type hydroprocessing catalytic reactor of the trickle type as described in which inclined permeable plate support a fixed catalyst bed thereon, and in which the catalyst comprises a defined, shape-selective catalyst material, such as crystalline aluminosilicate zeolite catalyst. The bed is traversed by a downwardly trickling flow of a liquid petroleum feedstock or lube, with the catalyst bed having hydrogen injected therethrough from below the permeable plate so as to pass through the liquid petroleum and react therewith in the presence of the catalyst, and to efficiently strip the liquid petroleum of low boiling and volatile conversion products, such as naphtha and LPG gases, and with the generated gases entraining the conversion products from the feedstock being scavenged from the reactor by an inert carrier gas flowing through the head space above the catalyst bed.

BRIEF DESCRIPTION OF THE DRAWINGS

Reference may now be had to the following detailed description of preferred embodiments of the invention which are representative of hydroprocessing trickle reactors for catalytically dewaxing liquid petroleum feedstocks, taken in conjunction with the accompanying drawings; in which.

DETAILED DESCRIPTION

Figure 1:
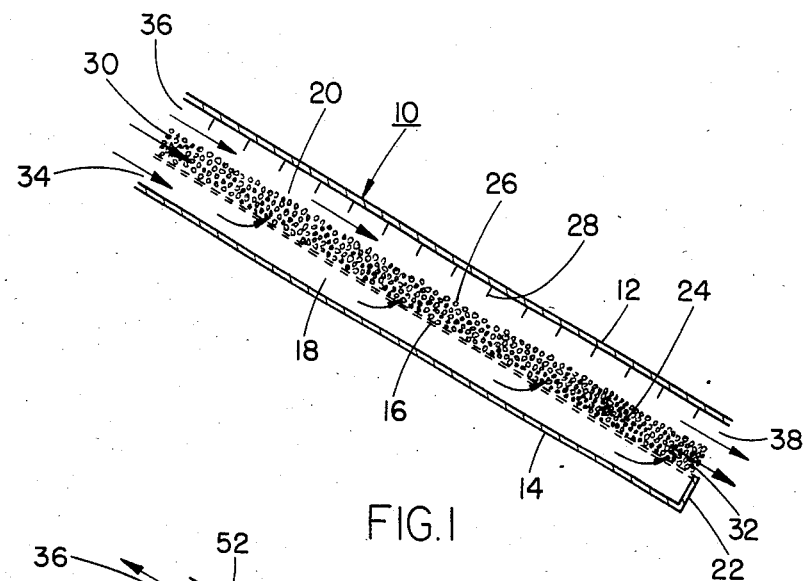
FIG. 1 diagrammatically illustrates a longitudinal sectional view through a first embodiment of a plate-type hydroprocessing trickle reactor constructed pursuant to the invention.

Referring now in detail to the embodiment of the hydroprocessing reactor disclosed in FIG. 1 of the drawings, the reactor essentially consists of an inclined or downward sloping multiple plate structure having a "sandwich" construction. The plate reactor 10 includes an upper impermeable plate 12 and a lower impermeable plate 14. A perforate or permeable plate 16 extends between plates 12, 14 in parallel spaced relationship therewith so as to provide a lower head space 18 between the bottom plate 14 and the permeable plate 16, and an upper head space 20 between the permeable plate 16 and the upper impermeable plate 12.

Towards the lower end of the inclined plate reactor 10, the lower head space 18 is closed off by means of a cover plate 22 extending between the lower end of plate 14 and the permeable plate 16.

Supported on the permeable plate 16 within the upper head space 20 is a layer or bed of a catalyst material 24, in this instance a shape-selective crystalline zeolite catalyst, preferably supported metal ZSM-5, although other zeolites such as described in Pelrine et al. U.S. Pat. No. 4,222,855 and Chen et al. U.S. Reissue Pat. No. 28,398 may also be employed with similar advantage as catalysts in the present hydroprocessing reactor construction.

The layer of the catalyst material which is supported on the permeable plate 16 is of a height to provide a further open area or head space 26 thereabove, into which a plurality of short transversely extending baffle members 28 extend downwardly from the inner surface of the upper impermeable plate 12.

In operation, liquid petroleum feedstock which is to be dewaxed is fed into the catalyst material bed 24 from the upper end 30 of the inclined plate reactor 10, so as to flow trickle down within the catalyst bed towards the lower end 32 of the reactor. Concurrently, hydrogen is introduced at a somewhat higher pressure differential into the lower head space 18 from the upper end 34 of the inclined plate reactor 10 and due to the slight pressure differential passes through the permeable plate 16 and percolates upwardly through the catalyst material 24 into the upper head space 20. The hydrogen passing through the catalyst material 24, which is also in counterflowing contact with the liquid petroleum feedstock flowing through the catalyst material, reacts with the feedstock and strips the lighter volatile components from the liquid petroleum feedstock and rises into the upper region or area 26 of the head space 20.

Concurrently, an inert carrier gas can be introduced into the head space region 26 from an upper end inlet 36 of the inclined plate reactor 10, and will flow downwardly and discharge from the reactor through the exit end 38, thereby scavenging the hydrogen and entrained lighter petroleum feedstock components which have been volatilized in the hydrogen from the reactor. The carrier gas can consist of hydrogen, nitrogen, helium, or any other suitable inert gas.

Alternatively, hydrogen alone can be employed to remove naphtha and light gases from the liquid feedstock, and can also serve as its own carrier gas once it rises into the upper head space 26 of the reactor from the catalyst bed.

Upon the stripping of the lighter volatile components or conversion products from the liquid petroleum feedstock, a typical product distribution from such a dewaxing reaction is as set forth in Table 1 hereinbelow:

TABLE 1

| Product Distribution | |
|---|---|
| Methane | 0.04 wt % |
| Ethane/Ethene | 0.09 |
| Propene | 0.03 |
| Propane | 2.13 |
| Total Dry Gas | 2.29 |
| Isobutane | 1.37 |
| Butenes | 0.03 |
| n-Butane | 1.44 |
| Total C$_4$'s | 2.84 |
| Total C$_5$'s | 1.98 |
| Naphtha, C$_6^+$ | 3.20 |
| Lube Fraction (dewaxed) | 89.69 |

Figure 2:
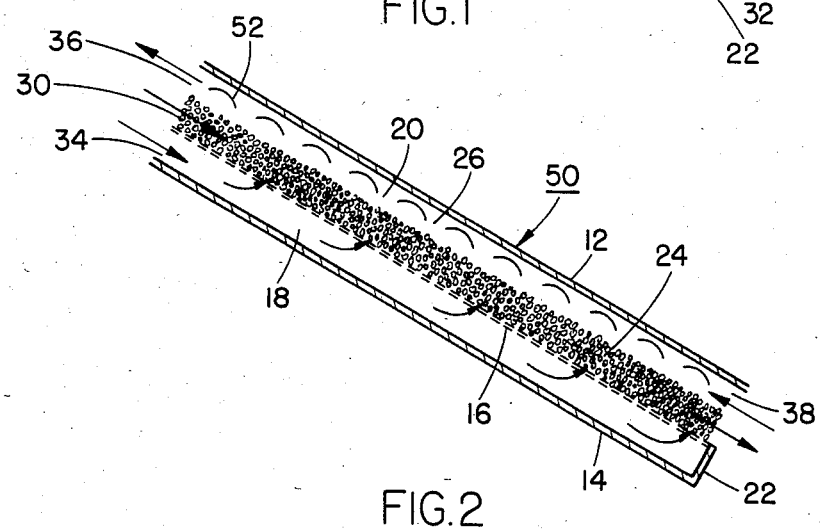
FIG. 2 is a view similar to that of FIG. 1 illustrating a second embodiment of the inventive plate-type hydroprocessing trickle reactor.

The embodiment of FIG. 2 of the drawing is substantially similar to that of FIG. 1 and represents primarily a structural and operational variant thereof, similar or identical components being designated with the same reference numerals.

In this instance, the inclined plate reactor 50 has the hydrogen entering at the upper reactor end 34, and the liquid feedstock at the upper end 30 of the inclined plate reactor in the same manner as FIG. 1; however, in this instance the carrier gas is introduced from the lower end 38 of the upper head space 26 and exits in countercurrent flow relative the hydrogen and liquid feedstock infeed from the upper end 36 of the inclined plate reactor.

In this embodiment, suitable curved bubble caps or mesh screens 52 may be arranged in the upper portion 26 of the head space 20 to reduce any possible liquid entrainment of liquid petroleum feedstock into the carrier gas head space of the reactor with resultant loss of product.

It also will be obvious to one skilled in the art that the type of the catalyst bed supported on the inclined permeable plate may change in composition as may be required by the particular lube or petroleum feedstock hydroprocessing conditions.

From the foregoing it becomes readily apparent to one skilled in the art that the present invention provides for a novel and improved hydroprocessing reactor for catalytically and efficiently dewaxing liquid petroleum feedstocks with a significant increase in the reaction rate and concomitant reductions in the catalyst coking rate, thereby resulting in appreciable capital cost savings through reduced reactor size and catalyst fill requirements, and also providing for reduced operating costs through reductions in down time for catalyst reactivation and rejuvenation. Furthermore, an additional economic advantage which is obtained through the inventive reactor design lies in that more of the cracked or hydrocracked product from the liquid petroleum feedstocks are recovered as utilizeable naphtha boiling range components rather than as light gas.

While there has been shown and described what are considered to be preferred embodiments of the invention, it will of course be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

What is claimed is:

1. A fixed-bed hydroprocessing reactor for catalytically dewaxing liquid petroleum feedstocks, comprising:
   (a) an upper and a lower imperforate plate arranged in parallel spaced relationship and being inclined relative to the horizontal axis, said plates defining a flowspace therebetween;
   (b) an inclined perforate plate extending in parallel spaced relationship between said upper and said lower imperforate plates so as to form a first flowspace between said upper plate and said perforate plate, said first flowspace comprising a headspace above an inclined stationary catalyst bed being supported by said inclined perforate plate and extending into said first flowspace, and a second flowspace between said perforate plate and said lower plate; said second flow space having an open end and a closed end, said closed end being sealed by a closure means which extends between said perforate plate and said lower plate;
   (c) said catalyst bed being of a crystalline catalyst material said bed having an upper end and a lower end with respect to said incline;
   (d) means for introducing liquid petroleum feed-stock into said upper end of said inclined catalyst bed to cause said feedstock to trickle down towards the lower end thereof; means for injecting hydrogen into the second flowspace from the open end thereof at a pressure to cause said hydrogen to pass upwardly through said perforate plate and to percolate through said catalyst bed and to strip low-boiling volatile conversion products from said liquid petroleum feedstock, said hydrogen gas and entrained conversion products rising into said headspace above said catalyst bed in the first flowspace; means for introducing an inert carrier gas into said headspace from one end thereof for scavenging said hydrogen gas and entrained conversion products from said reaction to form a dewaxed product; and means allowing said dewaxed product formed in said reactor to exit from said reactor.

2. A reactor as claimed in claim 1, wherein said closure means seals the lower end of the flowspace between said perforate plate and said lower plate.

3. A reactor as claimed in claim 1, wherein the hydrogen and the inert carrier gas are introduced from inlet means located at the upper end of said reactor into said flow spaces.

4. A reactor as claimed in claim 1, wherein the hydrogen is introduced into said second flow space from inlet means located at the upper end of said reactor, and the inert carrier gas is introduced in countercurrent flow relationship thereto, into the headspace above said catalyst bed from inlet means located at the lower end of said reactor.

5. A reactor as claimed in claim 1, comprising a plurality of baffle means fastened to said upper plate projecting into said headspace above the catalyst bed.

6. A reactor as claimed in claim 1, further comprising means for removing said inert carrier gas and the dewaxed liquid petroleum feedstock components from said reactor, concurrently.

7. A reactor as claimed in claim 1, comprising a plurality of bubble caps fastened to said upper plate extending into the headspace above the catalyst bed to reduce liquid entrainment into the carrier gas flowing through said headspace.

8. A reactor as claimed in claim 7, wherein said bubble caps comprise mesh screens.

9. A reactor as claimed in claim 1, wherein said crystalline catalyst comprises a shape-selective material.

10. A reactor as claimed in claim 9, wherein said catalyst material comprises an aluminosilicate.

11. A reactor as claimed in claim 10, wherein said aluminosilicate is ZSM-5.

* * * * *